(12) United States Patent
Moulsley et al.

(10) Patent No.: US 8,885,746 B2
(45) Date of Patent: Nov. 11, 2014

(54) METHOD FOR OPERATING A RADIO STATION IN A CELLULAR COMMUNICATION NETWORK

(75) Inventors: Timothy James Moulsley, Caterham (GB); Choo Chiap Chiau, Hertfordshire (GB); Robert James Davies, Milton (GB)

(73) Assignees: Koninklijke Philips N.V., Eindhoven (NL); Sharp Kabushiki Kaisha, Osaka (JP)

( * ) Notice: Subject to any disclaimer, the term of this patent is extended or adjusted under 35 U.S.C. 154(b) by 701 days.

(21) Appl. No.: 12/896,140

(22) Filed: Oct. 1, 2010

(65) Prior Publication Data

US 2011/0085587 A1 Apr. 14, 2011

(30) Foreign Application Priority Data

Oct. 8, 2009 (EP) .................................... 09172584

(51) Int. Cl.
*H04B 7/02* (2006.01)
*H04B 7/04* (2006.01)
*H04B 7/06* (2006.01)

(52) U.S. Cl.
CPC ............ *H04B 7/0617* (2013.01); *H01L 5/0023* (2013.01); *H04B 7/0408* (2013.01)
USPC ............ 375/267; 375/299; 375/347; 455/101

(58) Field of Classification Search
None
See application file for complete search history.

(56) References Cited

U.S. PATENT DOCUMENTS

| 2008/0311858 A1* | 12/2008 | Cheng et al. .................... 455/69 |
| 2010/0103858 A1* | 4/2010 | Palanki et al. ................. 370/315 |
| 2010/0208838 A1* | 8/2010 | Lee et al. ....................... 375/267 |
| 2010/0316156 A1 | 12/2010 | Higuchi et al. |

FOREIGN PATENT DOCUMENTS

| EP | 1916778 A2 | 4/2008 |
| WO | 2008114743 A1 | 9/2008 |

OTHER PUBLICATIONS

Catt, "Considerations on the Downlink Pilot Supporting Beamforming for TDD Mode", 3GPP TSG RAN WG1 LTE AD HOC, R1-060221, Helsinki, Finland, Jan. 23-25, 2006, pp. 1-6.
Alcatel-Lucent, "Support Multi-Layer Beamforming in LTE", 3GPP TSG-RAN WG1#56BIS, R1-091474, Seoul, Korea, Mar. 23-27, 2009, pp. 1-3.
Advanced LTE, "Further Advancements for E-Utra Physical Layer Aspects" 3rd Generation Partnership Project; Technical Specification Group Radio Access Network; , 3GPP TR36.814 V1.4.2, 2009, Release 9, pp. 1-50.

* cited by examiner

*Primary Examiner* — Adolf Dsouza (57) ABSTRACT

The present invention relates to a method for operating a primary station comprising a transceiver for communicating with a plurality of secondary stations, the transceiver including at least two antennas, the method comprising the primary station transmitting to a secondary station for a single spatial channel at least one first set of reference symbols with a first antenna and at least one second set of reference symbols with a second antenna, the second set of reference symbols being orthogonal to the first set of reference symbols.

17 Claims, 4 Drawing Sheets

METHOD FOR OPERATING A RADIO STATION IN A CELLULAR COMMUNICATION NETWORK

FIELD OF THE INVENTION

The present invention relates to a cellular communication network, comprising a primary station serving a cell and adapted for communicating with a plurality of secondary stations located within the cell.

This invention is, for example, relevant for UMTS or LTE or any system using reference symbols for the decoding of spatial channels. This invention may be advantageously implemented in systems using beamforming, or MIMO.

BACKGROUND OF THE INVENTION

Figure 1:
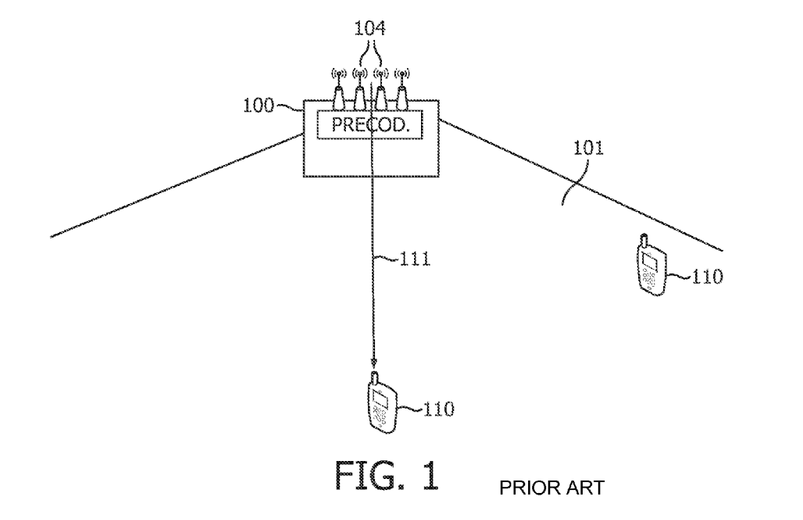
FIG. 1, already described, is a block diagram of a conventional telecommunication system.

A conventional telecommunication system is illustrated on FIG. 1. In such a system, the network is structured with a plurality of cells. In each cell, e.g. in cell 101 in FIG. 1, a primary station 100 serves the cell. This means that the primary station organizes and controls all communications with secondary stations 110 within the cell. The communication signals are transmitted on different channels. Typically, at least a downlink (from the primary station to the secondary station) data channel, and a downlink control channel are transmitted by the primary station. Similarly, uplink (from the secondary station to the primary station) corresponding data channels and control channels are also transmitted, but for the sake of clarity of the drawing, these channels are omitted from FIG. 1.

In an LTE system for example, the primary station 100 comprises a plurality of antennas and is able to adjust the respective transmit antenna gain and phase to create beamformied data streams towards a secondary station 110. These antenna gains and phases may constitute a precoding matrix (or vector if there is only one transmission beam). A control signalling message on the Physical Downlink Control Channel (PDCCH) is used to signal allocations of transmission resources on user channel PDDCH. In general, a beamformed transmission can be considered to be transmitted via a spatial channel. The reception of a beamformed data stream typically requires a phase and possibly an amplitude reference at the receiver. Such a reference can be provided by transmitting known reference symbols with the same beamforming vector as applied to the data. These reference symbols may be multiplexed with data or control information using known techniques such as TDM FDM or CDM. Therefore a spatial channel may be defined in terms of the reference symbols transmitted using a combination of a set of TDM, CDM, FDM and beamforming vector.

In order that the primary station 100 can schedule downlink data transmissions to make efficient use of system resources, secondary station 110 is typically expected to provide the primary station with feedback on the downlink channel state, for example with explicit feedback like a channel transfer function, an interference power level or an interference covariance matrix. It is also possible to have an implicit feedback, under the assumption of a particular transmission scheme, like a preferred transmission rank, a preferred precoding matrix or vector(s), or an achievable data rate (e.g. CQI). Such feedback is typically based on observation of periodically transmitted reference symbols designed for this purpose (i.e. CSI-RS or Channel State Indicator-Reference Symbol), and estimates of interference.

However, in a system like LTE-Advanced it is desirable to reduce the overhead due to transmission of CSI-RS and therefore CSI-RS are intended to be transmitted infrequently.

SUMMARY OF THE INVENTION

It is an object of the invention to propose a method for communicating in a network which alleviates the above mentioned problems.

It is another object of the invention to propose a method for communicating in a network which permits to a secondary station to measure and estimate the channel conditions.

Still another object of the invention is to provide a method for operating a communication system which permits to a secondary station to estimate the channel conditions without requiring too much overhead.

To this end, in accordance with a first aspect of the invention a method is proposed for operating a primary station comprising a transceiver for communicating with at least one secondary station, said transceiver including at least two antennas, the method comprising the primary station transmitting to a secondary station for a single spatial channel a first set of reference symbols with a first precoding vector applied before transmission and at least one second set of reference symbols with a corresponding second precoding vector applied before transmission, the at least one second set of reference symbols being orthogonal to the first set of reference symbols.

In accordance with a second aspect of the invention, a method is proposed for operating a secondary station, the secondary station comprising a transceiver for communicating with at least one primary station, the method comprising the secondary station receiving from the primary station for a single spatial channel a first set of reference symbols and at least one second set of reference symbols, the at least one second set of reference symbols being orthogonal to the first set of reference symbols, and the secondary station computing a phase difference between the phase of the received first set of reference symbols and the phase of at least one of the received at least one second set of reference symbols.

In accordance with a third aspect of the invention, a primary station is proposed comprising a transceiver for communicating with a plurality of secondary stations, said transceiver including at least two antennas, the transceiver being adapted for transmitting to a secondary station for a single spatial channel a first set of reference symbols with a first precoding vector applied before transmission and at least one second set of reference symbols with a corresponding second precoding vector applied before transmission, the at least one second set of reference symbols being orthogonal to the first set of reference symbols.

In accordance with a fourth aspect of the invention, a secondary station is proposed comprising a transceiver for communicating with at least one primary station, the transceiver being adapted for receiving from the primary station for a single spatial channel a first set of reference symbols and at least one second set of reference symbols, the at least one second set of reference symbols being orthogonal to the first set of reference symbols, and the secondary station comprising control means for computing a phase difference between the phase of the received first set of reference symbols and the phase of at least one of the received at least one second set of reference symbols.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a cellular telecommunication system as an UMTS or LTE telecommunication system. More specifically the present invention is based on the recognition that instead of using reference symbols specifically for estimating the channel conditions, this could be done with help of a modification to the dedicated reference symbols that are used in a conventional system for helping the decoding of a beamformed downlink data channel.

With reference to FIG. 1, the operation of the dedicated reference symbols (DRS) in a conventional communication system will be explained. As seen in the preamble of the specification, the system of FIG. 1 comprises a primary station 100 operating in cell 101 where a plurality of secondary stations 110 is located. For the sake of clarity, only two secondary stations are represented on FIG. 1. In this example, this system is an LTE telecommunication system, where a single carrier of up to 20 MHz is used. In this example, the primary station 100 transmits a beamformed data stream 111 with help of two antennas 104 where the signals transmitted from the antennas are weighted by the precoding coefficients. In this example we assume that only two of the four antennas of the primary station 100 are used for this data stream 111.

In connection with LTE, a primary station is likely to have at least four antennas, a set of which may be used for a single transmission as in this example. Similarly, the secondary station has multiple receive antennas (e.g. 2, 4 or 8). A control signalling message transmitted by the primary station 100 on the Physical Downlink Control Channel (PDCCH) is used to signal allocations of transmission resources, and in this example to signal information about the beamformed transmission.

Signalling of precoding vectors/matrices on the PDCCH allows the secondary station to compute phase reference(s) for demodulation of the data stream 111 from common reference symbols. As an alternative mode of operation, secondary station-specific Demodulation Reference Symbols (DRS) may be used to aid reception of downlink data transmissions from the primary station. The DRS occupy some of the resource elements (REs) in each resource block containing a data transmission to the secondary station. These resource elements are known to the secondary station 110 so that the secondary station is able to retrieve these REs and decode the reference symbols in them. Note that in the case of transmission of a second spatial channel to the secondary station 110, a set of DRS for each spatial channel will be required.

The set of DRS for the spatial channel 111 may be precoded in the same way as the data for that spatial channel 111, and since the locations and symbol values of the DRS are known to the secondary station 110, they can be used as a phase and amplitude reference for demodulation of data transmitted on that spatial channel 111. Equivalently, the dedicated reference symbols can be used to obtain a channel estimate of the combined channel formed by the precoding and the radio channel. The precoding for a spatial channel can be considered to create an antenna port and the set of DRS for that spatial channel are thus transmitted on the corresponding antenna port.

The set of DRS for each spatial channel can be distinguished by one or more of:

Modulation Sequence: i.e. different sequences of predetermined values for successive reference symbols Frequency domain (FDM) i.e. the REs used for sending DRS differ in the frequency domain Time domain (TDM) i.e. the REs used for sending DRS differ in the time domain Code domain (CDM) i.e. different spreading sequences are applied to the transmitted symbols comprising the DRS. In this case it would be convenient to use the same set of REs for sending each set of DRS for each spatial channel.

In practice the DRS for a given spatial channel may comprise aspects of all of these: Modulation Sequence, FDM, TDM, and CDM.

It is to be noted in this particular example of implementation that the maximum number of spatial channels which may be transmitted to the secondary station 110 in the single cell 101 is 8. Note that in itself this would not limit the total number of spatial channels being transmitted in a cell. Moreover, the number of Resource Elements for DRS in one Resource Block may be a number such as 12 or 24. Furthermore, it is assumed that the DRS design will allow some interpolation of the channel coefficients across one Resource Block, at least in some circumstances. In accordance with this conventional implementation, there is a one-to-one mapping between a set of DRS and transmissions on a single antenna port. In order that the primary station 100 can schedule downlink data transmissions to make efficient use of system resources, a secondary station is typically expected to provide the primary station with feedback on the downlink channel state as explained in the preamble of the description. As seen above, this feedback may be explicit or implicit and based typically on observation of periodically transmitted reference symbols designed for this purpose like CSI-RS, together with estimates of interference.

The invention is based on the recognition that if the number of available sets of DRS significantly exceeds the number of spatial channels (i.e. antenna ports) in use at any one time, then it is possible to associate more than one set of DRS with a given antenna port at the primary station. If each set of DRS is transmitted using a different set of precoding coefficients (i.e. using a different virtual antenna), then the secondary station may be able to derive additional channel state information by observing the different sets of DRS. In addition the secondary station can thus derive a phase reference for demodulation of the data transmissions from the antenna port. Therefore the secondary station should be aware of the appropriate algorithm for computing the phase reference from the received sets of DRS. As a simple example, let us consider the system of FIG. 1 with two transmit antennas (antenna 1, antenna 2) at the primary station. For simplicity of description the secondary station is assumed to have a single receive antenna, but the same principles can be applied for secondary stations with more than one antenna. A single spatial channel 111 is used to transmit data to a secondary station (i.e. a single transmit antenna port is used). The antenna weights for precoding the data transmission are w1 and w2.

According to the conventional system of FIG. 1, a first set of DRS would be transmitted with weight w1 from antenna 1 and also be transmitted with weight w2 from antenna 2. If the channel coefficients from the transmit antennas to the receive antenna are h1 and h2, then the secondary station 110 can derive a phase reference for the data from the combined received signal from both transmit antennas, which would be given by d1(w1.h1+w2.h2), where d1 is the reference symbol. Since d1 is known the channel estimate is given by (w1.h1+w2.h2) and this can be used as a phase reference.

According to a first embodiment of the invention, two sets of DRS are transmitted. The first set of DRS d1 is transmitted using weight w1 from antenna 1 and the second set of DRS d2 is transmitted using weight w2 from antenna 2.

Now, the signal received at the secondary station is (d1.w1.h1+d2.w2.h2). Provided that d1 and d2 are orthogonal and both known to the secondary station, then w1.h1 and w2.h2 can both be derived independently. In addition, the channel estimate and phase reference equivalent to the one required by the conventional system, (w1.h1+w2.h2), can also be obtained.

Figure 2:
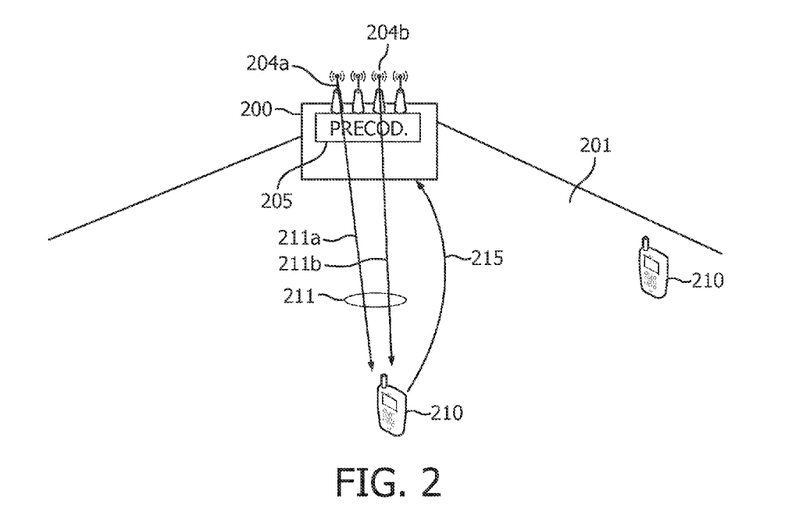
FIG. 2 is a block diagram representing a communication system in accordance with a first embodiment of the invention.

This first embodiment is represented in FIG. 2. The telecommunication system of FIG. 2 comprises a primary station 200 operating in cell 201 where a plurality of secondary stations 210 is located. For the sake of clarity, only two secondary stations 210 are represented on FIG. 2. The primary station 200 comprises a plurality of transmit antennas 204 controlled by a precoder 205 which can adjust the gain and phase of the transmit antennas to transmit in a beamforming mode on spatial channels. A data beam 211 is represented on FIG. 2 from the primary station 200 to a secondary station 210. This data beam 211 forming a spatial channel may be transmitted on data channel like the PDSCH (Physical Downlink Shared CHannel). The secondary station may be informed by physical layer signalling (e.g. PDCCH or Physical Downlink Control CHannel) of the spatial channel (i.e. of the virtual antennas) used for the data transmission carried out on the PDSCH. Moreover, the secondary station 210 may be informed by higher signalling from the primary station 200 which sets of DRS will be used, and which sets of DRS are associated with the spatial channel 211. In a variant of the invention, the number of downlink antennas is not explicitly signaled to the secondary station which deduces the number of downlink antennas available in a cell and the sets of DRS which are potentially available. As an example, if the transmission scheme (such as transmit diversity) used for a control channel depends on the number of transmit antennas, the secondary station may attempt decoding the control channel under different hypotheses about the number of antennas. With an appropriate system design, correct decoding will only occur when the correct hypothesis on the number antennas is selected.

The spatial channel 211 results here from the combination of two component signals 211a and 211b. These signals 211a and 211b include each a respective set of DRS, which are orthogonal one to another. Thus, the secondary station 210 may thus estimate the product of the precoding and the channel conditions for each of the transmit antennas 204a or 204b respectively, namely w1.h1 and w2.h2 as explained above. Indeed, given that the respective sets of dedicated reference symbols are orthogonal one to another, it is possible for the secondary station to estimate independently the received signals corresponding to the reference signals of the two component signals 211a and 211b.

Figure 3:
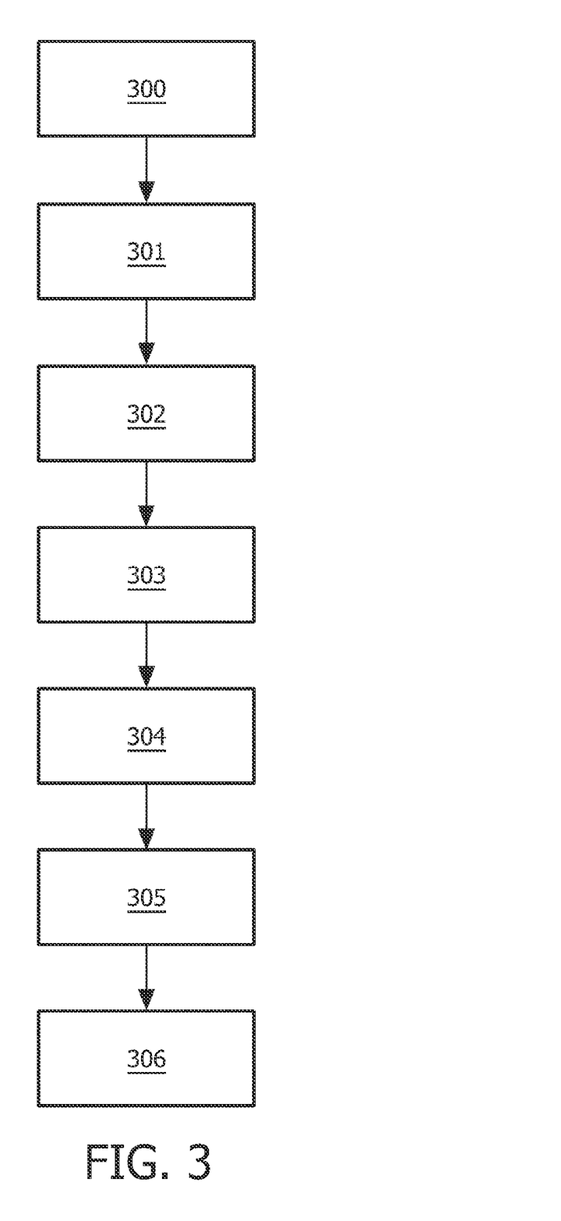
FIG. 3 is a flow chart representing a method in accordance with the invention.

With reference to FIG. 3, the method implemented in the first embodiment of the invention is now explained. At step 300, the primary station 200 transmits the component signals 211a and 211b with their respective sets of reference signals. To achieve this, the primary station 200 applies precoding to the data which is transmitted using the spatial channel and applies suitable precoding to the corresponding sets of DRS so that the secondary station may derive a phase reference according to a signalled algorithm or a predetermined algorithm. An example of an appropriate algorithm for a system with one set of DRS for a spatial channel could be to find the value of complex constant which when multiplied by a signal representing the known or assumed DRS transmission gives the minimum mean square error with respect to the corresponding received signal. This constant would then be an estimate of the channel transfer function, This can be used to provide a phase reference for demodulation of a data transmission on the corresponding spatial channel. In a system with two DRS for a single spatial channel an appropriate algorithm would be to use a phase reference based on an average of the two channel estimates derived from each of the corresponding DRS. The component signals 211a and 211b form the spatial channel 211. At step 301, the secondary station 210 receives the component signals 211a and 211b. The secondary station 210 derives channel estimates the respective received reference symbols of signals 211a and 211b at step 302 and deduces a phase reference from these channel estimates at step 303 by means of an algorithm. In a variant, the secondary station 210 is informed by higher layer signalling of the algorithm to be applied to derive the phase reference for each spatial channel from the received sets of DRS. An example of a selection of algorithms, higher layer signaling indicates that the phase reference should be derived from either the sum of the channel estimates or the difference between the channel estimates. In this example only there is a single spatial channel but the same applies for a plurality of spatial channels. The secondary station 210 is also able to make measurements of the received phase of each set of DRS (relative to one set which is used as a reference) at step 304. The phase measurements are then quantised and signalled in a signaling message 215 to the primary station 200 at step 305. The primary station can use these measurements to refine the precoding at step 306.

In a variant of this first embodiment, the secondary station provides more detailed channel state feedback to the primary station in addition to, or instead of, the phase measurements. For example the feedback could include known parameters such as CQI (Channel Quality Indicator), or amplitude information such as average amplitude or amplitude difference.

Regarding the transmission of the sets of Reference Symbols, for the secondary station, it is preferable that no data is sent (on any spatial channel) in any Resource Element used for DRS. This avoids any interference between data and the DRS which would otherwise reduce the accuracy of the channel estimate obtained by the secondary station. For FDM, TDM and CDM this implies that the resource elements used for any DRS are not available for data on any spatial channel.

In principle, the maximum number of spatial channels which can be supported for a single Resource Block is equal to the total number of resource elements allocated for DRS. In practice, this maximum number may be set at a lower level, for example such that the total number of Resource Elements allocated to DRS is equal to a multiple of the maximum number of allowed spatial channels. The number of REs allocated for DRS may be proportional to the number of spatial channels actually transmitted to a secondary station. This is applicable for FDM or TDM and has the advantage of minimising the overhead from DRS when fewer spatial channels are transmitted than the maximum.

The number of resource elements allocated for DRS may be fixed (e.g. as a multiple of the maximum number of spatial channels which may be transmitted to a UE). This can be seen as a natural consequence of using CDM. For FDM and TDM as well as CDM it also allows different spatial channels to be transmitted to more than one secondary station simultaneously. This requires that a secondary station is aware of which sets of DRS it should use as references for receiving its data (and which DRS corresponded to which part of the data stream). This may be indicated explicitly by signaling, for example indicating a mapping between DRS and spatial channels or implicitly for example a fixed mapping depending on the number of spatial channels transmitted.

The number of resource elements allocated for the DRS may be variable independently of the number of spatial channels. This would allow more or less reference symbols to be used for a given spatial channel, depending on whether the particular transmission mode (e.g. modulation scheme such as 16QAM or 64QAM) in a particular channel (e.g. high or low mobility speed) would benefit from more accurate channel estimation which is possible with more reference symbols. This benefit would be balanced against loss in data rate from the increased overhead of transmitting more reference symbols.

It is to be noted that a secondary station at a cell border may receive DRS simultaneously from more than one cell, i.e. from neighboring cells of cell 201. In this case, it is advantageous to operate the system such that the same frame timing is used in adjacent cells and also such that DRS from different cells can be distinguished (e.g. by different Modulation Sequence/FDM/TDM/CDM). If the secondary station can identify different DRS from different cells, and has multiple receive antennas then at least the following possibilities exist:

Reception by secondary station 210 of a data transmission from cell 201 and adjustment of receive weights to reject the spatial channels from other cells.

Simultaneous reception by secondary station 210 of data transmissions from cell 201 and from at least another cell (using different spatial channels and different DRS).

In a variant, it is particularly advantageous for the secondary station 210 to be able to distinguish DRS from different cells using different modulation sequences, since this would not increase the number of resource elements needed for DRS. However, the performance of this approach may be lower with rapidly changing channels.

In a variant of the first embodiment, continuing with the example of FIG. 2, the transmission is designed to ensure equal power from each transmit antenna, so that w1 and w2 both have equal magnitude. In this case, maximising the received SNR may be achieved by choosing the correct phase for w2 relative to w1, i.e. to maximise (w1.h1+w2.h2). In this case, the aim 1s to make the phase of w2.h2 equal to the phase of w1.h1. As mentioned earlier, according to the first embodiment of the invention, the secondary station can derive both w1.h1 and also w2.h2 from the corresponding orthogonal sets of DRS. Although under these assumptions the secondary station cannot easily obtain w1, h1, w2 or h2 individually, it can easily compute the phase difference between w1.h1 and w2.h2, and feed it back (e.g. in quantised form to the primary station at step 305). This information is needed by the primary station 200 to make any necessary adjustment to the phase difference at the transmitter between w1 and w2 at step 306.

In a variation of this example, the quantisation and the signaling of the phase measurements of step 305 uses one bit to indicate whether the phase is too high or too low (i.e. positive or negative). Thus, this permits the creation of a kind of control loop so that the primary station is able to adjust the precoding of the spatial channel by means of the estimates. Moreover, the signaling being limited to one bit in this example, this avoids the use of too much resource. It is to be noted that more than one bit could be used to have two sizes of feedback phase step command. For example, the quantisation of the phase measurements may use two bits, one bit to indicate whether the phase is positive or negative, and another bit to indicate the amplitude of the phase.

In an implementation of this embodiment, the quantisation of the phase measurements is transmitted by adapting an existing uplink signalling channel (e.g. replacing PMI and/or RI bits which with phase measurements).

Figure 4:
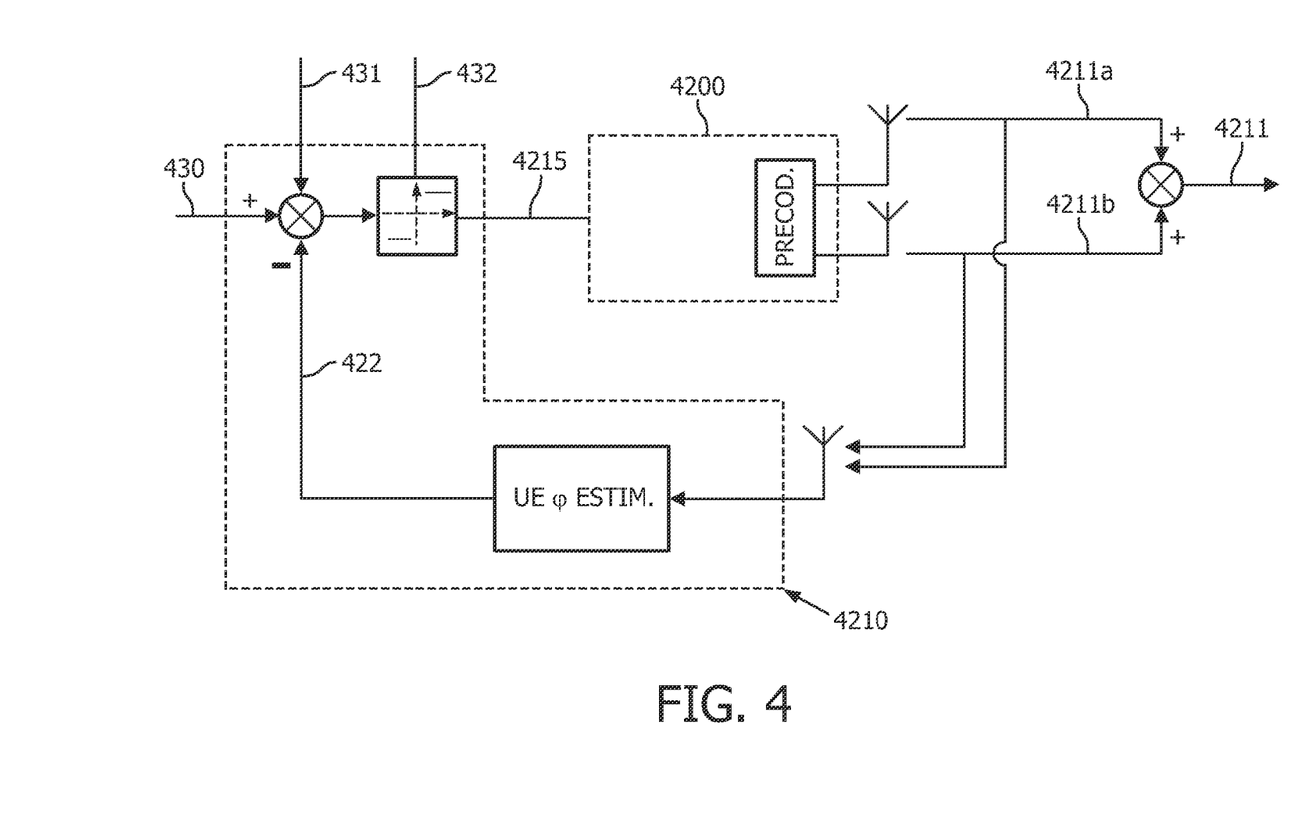
FIG. 4 is a block diagram representing the phase control loop formed by a secondary station and a primary station of the first embodiment.

FIG. 4 represents in a schematic way the phase control loop formed by the primary station and the secondary station. In accordance with this approach, the primary station 200 may be considered as the block 4200 receiving the difference signal 4215 from the secondary station forming block 4210 which receives the spatial channel 4211. From this reference signals in the spatial channel 4211 formed by the signals 4211a and 4211b, the secondary station block 4210 estimates a phase difference in accordance with an algorithm. This phase difference 422 is compared with a phase difference target 430, being in this example zero. The zero value maximizes the quality of the signal (SNR) or the throughput. This phase reference target 430 is compared in the comparator 431 in the secondary station block 4210 with the phase difference 422. The result of this comparison is quantized in the quantization block 432, and transmitted as a signal 4215 to the primary station block 4200. The primary station 4200 adjusts its precoding weights based on the received signal 4215 to transmit the spatial channel 4211.

In a variation of the above control loop, the first feedback (for a predetermined number of estimations) given by the secondary station comprises a complete precoding matrix indicator representative of the preferred precoding vector (or precoding matrix for transmission rank being more than 1). Then, the primary station may apply this precoding vector feedback (or another precoding vector depending on other transmissions) to the data transmission. After a predetermined number of estimations, the feedback transmitted by the secondary station may take the form of the one or two bits of phase commands.

In another example of this variant, the value of w1 may be fixed (e.g. with zero phase). This effectively makes antenna 1 a reference. The same approach can be extended to the case where the secondary station receives transmissions from more than one antenna port. In this case, a physical antenna might transmit more than one set of DRS at the same time. Therefore a desirable property of the sets of DRS would be that the sum of the signals corresponding to each weighted set of DRS gives a combined signal which is of substantially constant amplitude.

As a simple example of the problem for the case of CDM, let us consider a possible DRS spreading sequence (1,1). A second orthogonal spreading sequence could be (1,−1). However, if the modulation symbol for both DRS had value 1 and this is multiplied by the spreading sequences and these two signals are added together the result is (2,0). So if transmitted at the same time this would require double the power for the first symbol location and zero power for the second one. Equal amplitude could be achieved by appropriate design of DRS signals. For example, if the second DRS sequence were (j,−j), then the sum of the first and second sequences would be (1+j, 1−j).

However, the different sets of DRS are likely to have different precoding coefficients applied, so this uniform amplitude condition may not always be met. To solve this, it is proposed to assign specific sets of DRS to particular the spatial channels, aiming for constant amplitude when considering the precoding to be applied. It is also possible that the DRS are not precoded. Then, the primary station transmits additional information (e.g. precoding coefficients) which specifies how the phase reference should be derived from the DRS. It requires a separate signaling of the algorithm to estimate the phase reference of the DRS. In another example, the reference symbols are precoded, but some sets of DRS have a phase rotation applied in order to achieve constant amplitude.

In another example, the reference symbols are precoded, but some sets of DRS have a phase rotation applied in order to achieve substantially equal amplitudes for the combined DRS transmission from each transmit antenna. In order for the secondary station to be able receive data transmitted on a spatial channels corresponding where some DRS are phase rotated to other DRS, the phase rotation would need to be known at the secondary station.

In an embodiment where more than one spatial channel is transmitted, with one or more sets of DRS per spatial channel transmitted using CDM, substantially equal amplitudes for the combined DRS transmission from each transmit antenna may be achieved by applying a phase rotation to the DRS for a given spatial channel. Therefore, the primary station, when transmitting DRS using CDM, would need to be able to select a phase rotation to apply to the set or sets of DRS corresponding to a given spatial channel in order to achieve a good power balance among the transmit antennas when transmitting the combined DSR signal. The phase rotation would be selected considering the precoding applied to each spatial channel and would also be applied to the corresponding set of DRS. The same phase rotation should be applied to the data transmitted on the corresponding spatial channel. This is equivalent to applying a phase rotation to the precoding coefficients for a given spatial channel in order to adjust or control the power of the combined DRS transmission from each transmit antenna in the REs containing DRS. Such a phase rotation can be freely chosen by the primary station since an equal phase rotation applied to all elements of a precoding vector does not change the beam pattern. Preferably the same precoding coefficients (including any phase rotation) should be applied to both DRS and data.

Another approach is for some characteristics are varied in a known way to avoid the persistent occurrence of non-constant amplitude (e.g. a frequency or time dependent phase rotation is applied). This can be achieved with different pseudo random modulation sequence for each spatial channel.

In a variation of the first embodiment the algorithm for deriving the phase reference for a spatial channel is fixed and comprises adding the composite channel estimates derived from each of the DRS associated with that spatial channel. It means that the algorithm is simply the sum of the quantities of w1.h1 and w2.h2 in the example of the first embodiment, and the phase reference is derived from the result.

In a further variation of the first embodiment the algorithm for deriving the phase reference for a spatial channel is to add channel estimates derived from each of the DRS associated with that spatial channel, where each channel estimate has a phase rotation applied which is signalled by the primary station. Indeed, the primary station applies a corresponding phase rotation to each transmitted DRS. For example, if a phase rotation is applied to one antenna, e.g. an a rotation to antenna 2, the algorithm would be to sum the phases of w1.h1 and w2.h2 and to subtract a to the result or as summarized in the below equations:

$$\Delta \text{Phase} = \phi(w1.h1) + \phi(w2.h2) - \alpha$$

In a further variation of the first embodiment the algorithm for deriving the phase reference for a spatial channel is to add channel estimates derived from each of the DRS associated with that spatial channel, where each channel estimate has a phase rotation applied which depends on the frequency (e.g. resource block or sub-carrier) and/or time (e.g. subframe number). The primary station applies a corresponding phase rotation to each transmitted DRS. As an example the value of α in the previous variation is a function of frequency.

In the first embodiment, only one spatial channel is transmitted to the secondary station 210. The same applies for more than one spatial channel transmitted to a secondary station. In this case, corresponding sets of reference symbols are allocated to each spatial channel. The sets of DRS for the first spatial channel, being orthogonal one to another may be chosen and/or precoded to also be orthogonal to the sets of DRS for a second spatial channel.

In a further variation, the primary station has N physical antennas (e.g. N=2) and the one set of DRS is transmitted for each physical antenna.

A second embodiment is otherwise like the first embodiment but the secondary station also makes amplitude measurements of one or more of the received DRS, and reports these to the primary station. This would allow the primary station to decide on the appropriate transmission mode, for example to allocate more or less power to the transmission from a particular antenna (e.g. corresponding to one of the sets of DRS).

Figure 5:
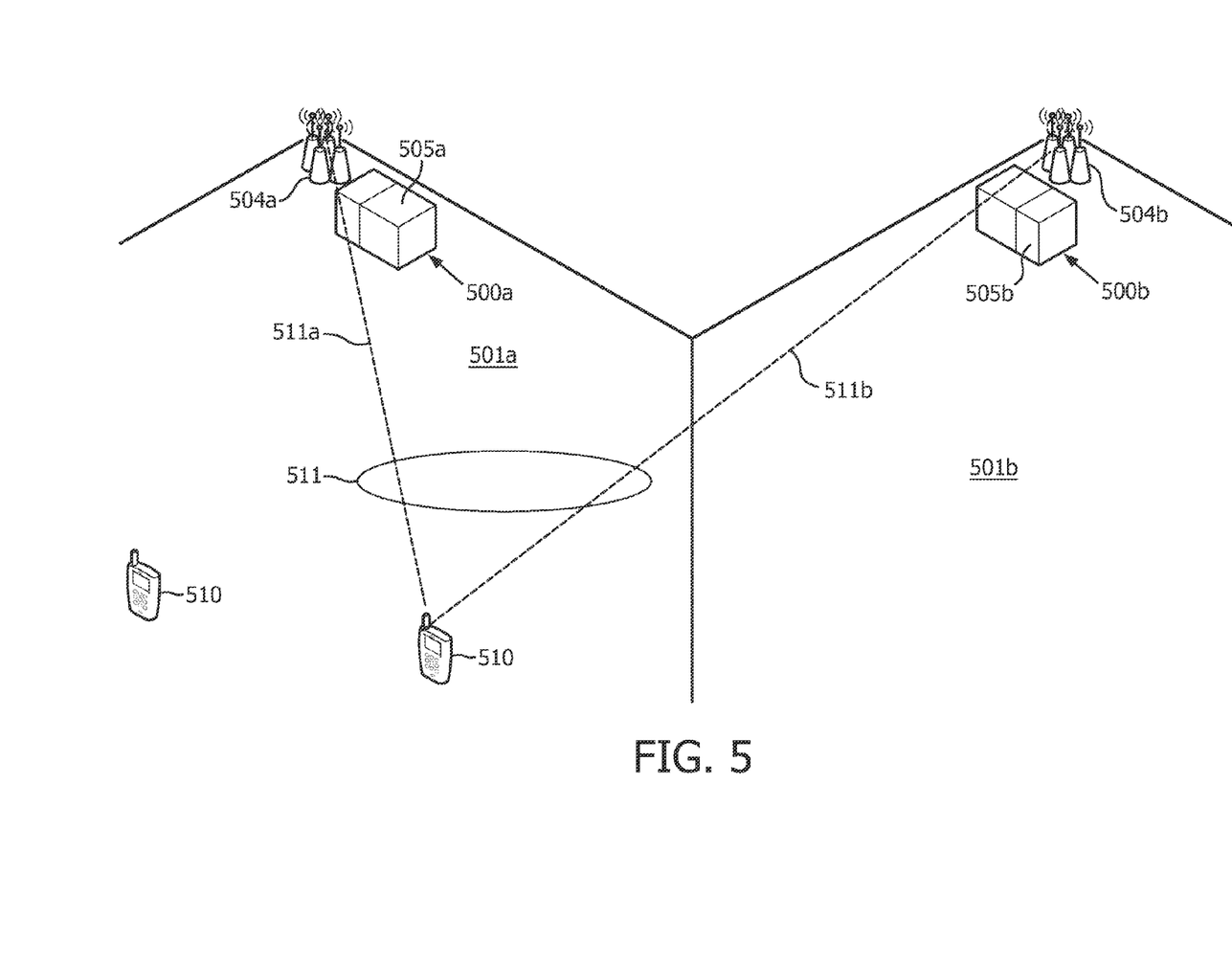
FIG. 5 is a block diagram representing a communication system in accordance with another embodiment of the invention.

FIG. 5 illustrates a third embodiment of the invention. The telecommunication system of FIG. 5 comprises a primary station 500*a* operating in a first cell 501*a* where a plurality of secondary stations 210 is located. A neighboring cell 501*b* is operated by a primary station 500*b*. In a variant of this embodiment, the first cell 500*a* and the second cell 501*b* are operated by the same primary station. For the sake of clarity, only two secondary stations 510 are represented on FIG. 5. The primary stations 500*a* and 500*b* comprise a plurality of transmit antennas 504*a* and 504*b* respectively controlled by a precoder 505*a* and 505*b* which can adjust the gain and phase of the transmit antennas to transmit in a beamforming mode on spatial channels. A data beam 511 is represented on FIG. 5 from the primary stations 500*a* and 500*b* to a secondary station 510. This data beam 511 forming a spatial channel may be transmitted on data channel like the PDSCH (Physical Downlink Shared CHannel). The spatial channel 511 results here from the combination of two component signals 511*a* and 511*b* respectively transmitted by the primary station 500*a* and 500*b*. These signals 511*a* and 511*b* include each a respective set of DRS, which are orthogonal one to another. Thus, the secondary station 510 may thus estimate the product of the precoding and the channel conditions for each transmit antennas 504*a* or 504*b* respectively, namely w1.h1 and w2.h2 as explained above. Indeed, given that the respective sets of dedicated reference symbols are orthogonal one to another, it is possible for the secondary station to estimate independently received signals corresponding to the reference signals of the two component signals 511*a* and 511*b*.

As in the first embodiment, the secondary station may be informed by physical layer signalling (e.g. PDCCH or Physical Downlink Control CHannel) of the spatial channel (i.e. of the virtual antennas) used for the data transmission carried out on the PDSCH. Moreover, the secondary station 510 may be informed by higher signalling from the primary station 500a and/or from the primary station 500b which sets of DRS will be used, and which sets of DRS are associated with the spatial channel 511. In a variant of this embodiment, the number of downlink antennas is not explicitly signaled to the secondary station which deduces the number of downlink antennas available in a cell and the sets of DRS which are potentially available. As an example, if the transmission scheme (such as transmit diversity) used for a control channel depends on the number of transmit antennas, the secondary station may attempt decoding the control channel under different hypotheses about the number of antennas. With an appropriate system design, correct decoding will only occur when the correct hypothesis on the number antennas is selected.

As a consequence, the third embodiment is otherwise like the first embodiment with a single spatial channel transmitted to the secondary station, but this is comprised of identical data transmissions from two (or more) cells (or access points). The transmissions from each cell are associated with a different set of DRS (for example one set of DRS for each cell). The phase reference for reception of the data transmission is derived by adding the channel estimates from each of the sets of DRS.

A fourth embodiment of the invention is like the first embodiment, where the primary station may transmit one or two spatial channels to the secondary station. In the case of two spatial channels (i.e. rank 2 transmission with 2 codewords) the primary station transmits two sets of DRS, one for each spatial channel. The secondary station receives the two sets of DRS and can derive the respective phase references for receiving the two spatial channels (and two codewords). The correct reception (or otherwise) of each codeword is indicated by the secondary station sending two ACK/NACKs via the PUCCH (Physical Uplink Control CHannel). In the case of one spatial channel (i.e. rank 1 transmission) the primary station also transmits two sets of DRS, one for each of two antennas or virtual antennas. The secondary station combines the two received DRS to form a single phase reference for the reception of the single codeword. The correct reception (or otherwise) of the codeword is indicated by sending an ACK/NACK via the PUCCH. The place of the other available ACK/NACK is taken by a single bit of quantised phase information, indicating the phase difference between the two phase references (or channel estimates) each derived from one of the received sets of DRS. The primary station can use this information to improve the precoding/beamforming applied to subsequent transmissions of a single codeword.

The present invention shall not only be construed to the above embodiments and it will be clear for someone skilled in the art that the above variants and examples may be combined and adapted in various implementations of the invention.

The invention is applicable to systems using co-operative beamforming between cells which may include LTE-Advanced. The cells may be located a single base station site, or on different sites, for example femto-cells implemented by fibre radio techniques.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a primary station comprising a transceiver for communicating with at least one secondary station, said transceiver including at least two antennas, the method comprising:
the primary station transmitting to a secondary station for a single spatial channel a first set of reference symbols with a first precoding vector applied before transmission, wherein an element of the first precoding vector has a phase established as zero, and at least one second set of reference symbols with a corresponding second precoding vector applied before transmission, wherein an element of the second precoding vector has a phase established as non-zero, the at least one second set of reference symbols being orthogonal to the first set of reference symbols.

2. The method of claim 1, comprising the primary station providing the secondary station with an identifier of at least one of the first and the second sets of reference symbols.

3. The method of claim 1, further comprising the primary station transmitting to the secondary station for a second single spatial channel a third set of reference symbols with a third precoding vector applied before transmission and at least one fourth set of reference symbols with a corresponding fourth precoding vector applied before transmission, the third set of reference symbols being orthogonal to the first set of reference symbols, the at least one second set of reference symbols and the at least one fourth set sliding mechanism of reference symbols, and the at least one fourth set of reference symbols being orthogonal to the first set of reference symbols and the at least one second set of reference symbols.

4. The method of claim 3, wherein the third precoding vector is equal to the first precoding vector and the fourth precoding vector is equal to the second precoding vector.

5. The method of claim 1, wherein the first and the second sets of reference symbols are arranged so that a signal resulting from a sum of the first set of reference symbols precoded with the first precoding vector and of the second set of reference symbols precoded with the second precoding vector is of constant amplitude.

6. The method of claim 5, wherein the primary station applies a phase rotation to at least one of: the first set of reference symbols and the second sets of reference symbols wherein a signal resulting from a sum of the first set of reference symbols precoded with the first precoding vector and the second set of reference symbols precoded with the second precoding vector is of constant amplitude across said at least two antennas.

7. The method of claim 6, wherein the primary station signals the applied phase rotation to the secondary station.

8. The method of claim 1 , further comprising:
at least one of the plurality of primary stations transmitting for a further single spatial channel a third set of reference symbols with a third precoding vector applied before transmission and at least one fourth set of reference symbols with a corresponding fourth precoding vector applied before transmission, wherein the primary station applies a rotation to the third and the fourth precoding vectors so that a transmission power level is the same on each transmitting antenna.

9. A method for operating a plurality of primary stations, each comprising a transceiver for communicating with at least one secondary station, said transceiver including at least two antennas, the method comprising:
- a first one of the plurality of the primary stations transmitting to a secondary station for a single spatial channel a first set of reference symbols with a first precoding vector applied before transmission, wherein an element of the first precoding vector has a phase established as zero and a second one of the plurality of the primary stations transmitting to said secondary station at least one second set of reference symbols with a corresponding second precoding vector applied before transmission, wherein an element of the second precoding vector has a phase established as non-zero, the at least one second set of reference symbols being orthogonal to the first set of reference symbols.

10. A method for operating a secondary station, the secondary station comprising a transceiver for communicating with at least one primary station, the method comprising:
- receiving from the primary station for a single spatial channel a first set of reference symbols and at least one second set of reference symbols the at least one second set of reference symbols being orthogonal to the first set of reference symbols, and
- computing a phase difference between a phase of the received first set of reference symbols and a phase of at least one of the received at least one second set of reference symbols, wherein an element of the first set of reference symbols has a phase established as zero and an element of the second set of reference symbols has a phased established as non-zero.

11. The method of claim 10, further comprising the secondary station signaling the phase difference to the at least one primary station.

12. The method of claim 10, wherein the computing of the phase difference includes the secondary station making channel estimates for each of the first and the second sets of reference symbols.

13. A primary station comprising:
- a transceiver for communicating with a plurality of secondary stations, said transceiver including at least two antennas, the transceiver transmitting to a secondary station for a single spatial channel a first set of reference symbols with a first precoding vector applied before transmission, wherein at least one element has a phase established as zero, and at least one second set of reference symbols with a corresponding second precoding vector applied before transmission, wherein at least one element has a phase established as non-zero, the at least one second set of reference symbols being orthogonal to the first set of reference symbols.

14. A secondary station comprising:
- a transceiver communicating with at least one primary station, the transceiver receiving from the primary station for a single spatial channel a first set of reference symbols and at least one second set of reference symbols, the at least one second set of reference symbols being orthogonal to the first set of reference symbols, and control means:
- computing a phase difference between a phase of the received first set of reference symbols and a phase of at least one of the received at least one second set of reference symbols, wherein an element of the first set of reference symbols has a phase established as a zero phase and an element of the second set of reference symbols has a phased established as a non-zero phase, and
- transmitting said phase difference to said primary station.

15. A method for operating a primary station comprising a transceiver for communicating with at least one secondary station, said transceiver including at least two antennas, the method comprising:
- the primary station transmitting to a secondary station, for a single spatial channel, a first set of reference symbols with a first precoding vector applied before transmission and at least one second set of reference symbols with a corresponding second precoding vector applied before transmission, the at least one second set of reference symbols being orthogonal to the first set of reference symbols, wherein a phase of the first element of the first precoding vector has a phase value established as zero.

16. A method for operating a primary station comprising a transceiver for communicating with at least one secondary station, said transceiver including at least two antennas, the method comprising:
- the primary station transmitting to a secondary station, for a single spatial channel, a first set of reference symbols with a first precoding vector applied before transmission and at least one second set of reference symbols with a corresponding second precoding vector applied before transmission, the at least one second set of reference symbols being orthogonal to the first set of reference symbols and the first and the second sets of reference symbols are arranged so that a signal resulting from a sum of the first set of reference symbols precoded with the first precoding vector and of the second set of reference symbols precoded with the second precoding vector is of constant amplitude.

17. A method for operating a primary station comprising a transceiver for communicating with at least one secondary station, said transceiver including at least two antennas, the method comprising:
- the primary station transmitting to a secondary station for a single spatial channel a first set of reference symbols with a first precoding vector applied before transmission and at least one second set of reference symbols with a corresponding second precoding vector applied before transmission, the at least one second set of reference symbols being orthogonal to the first set of reference symbols wherein the primary station applies a same first phase rotation to each of the symbols in the first set of reference symbols and a same second phase rotation to each of the symbols in the second set of reference symbols, wherein the phase of a symbol in the first set of symbols is established as a zero phase and the phase of a symbol in the second set of symbols is established as a non-zero phase.

* * * * *